United States Patent
Hilbert

(10) Patent No.: US 6,705,686 B2
(45) Date of Patent: Mar. 16, 2004

(54) METHOD AND APPARATUS FOR BRAKING A HYBRID ELECTRIC VEHICLE

(75) Inventor: Harold Sean Hilbert, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/248,020

(22) Filed: Dec. 11, 2002

(65) Prior Publication Data

US 2003/0184156 A1 Oct. 2, 2003

Related U.S. Application Data

(63) Continuation-in-part of application No. 10/063,153, filed on Mar. 26, 2002, now abandoned.

(51) Int. Cl.⁷ ................................................. B60K 6/04
(52) U.S. Cl. ..................................... 303/152; 180/65.2
(58) Field of Search ............... 303/152; 180/65.1–65.6; 290/40 C

(56) References Cited

U.S. PATENT DOCUMENTS

| | | | |
|---|---|---|---|
| 4,951,769 A | 8/1990 | Kawamura | |
| 5,492,192 A | 2/1996 | Brooks et al. | |
| 5,910,722 A | 6/1999 | Lyons et al. | |
| 6,026,921 A * | 2/2000 | Aoyama et al. | 180/65.2 |
| 6,054,776 A | 4/2000 | Sumi | |
| 6,099,089 A | 8/2000 | Schneider | |
| 6,110,066 A | 8/2000 | Nedungadi et al. | |
| 6,116,368 A | 9/2000 | Lyons et al. | |
| 6,126,251 A | 10/2000 | Yoshii et al. | |
| 6,176,556 B1 | 1/2001 | Kizer | |
| 6,283,239 B1 * | 9/2001 | Tsukamoto et al. | 180/65.2 |
| 6,334,498 B1 | 1/2002 | Morisawa et al. | |
| 6,359,345 B1 * | 3/2002 | Suzuki | 290/40 C |
| 6,543,565 B1 * | 4/2003 | Phillips et al. | 180/165 |
| 2002/0023789 A1 * | 2/2002 | Morisawa et al. | 180/65.2 |
| 2003/0042054 A1 * | 3/2003 | Matsubara et al. | 180/65.2 |

* cited by examiner

Primary Examiner—Christopher P. Schwartz
(74) Attorney, Agent, or Firm—Dykema Gossett PLLC; Carlos L. Hanze

(57) ABSTRACT

A method and system for braking a hybrid electric vehicle having an internal combustion engine and a traction motor coupled to a common output shaft, with the vehicle also having an energy storage battery. The method includes monitoring of the vehicle to determine if the vehicle's driver is operating the vehicle in a braking mode and if so, controlling the engine and traction motor so as to provide dynamic braking such that when the traction motor is operated regeneratively, the brake torque produce by the engine is reduced from a maximum contemporaneous brake torque value.

16 Claims, 3 Drawing Sheets

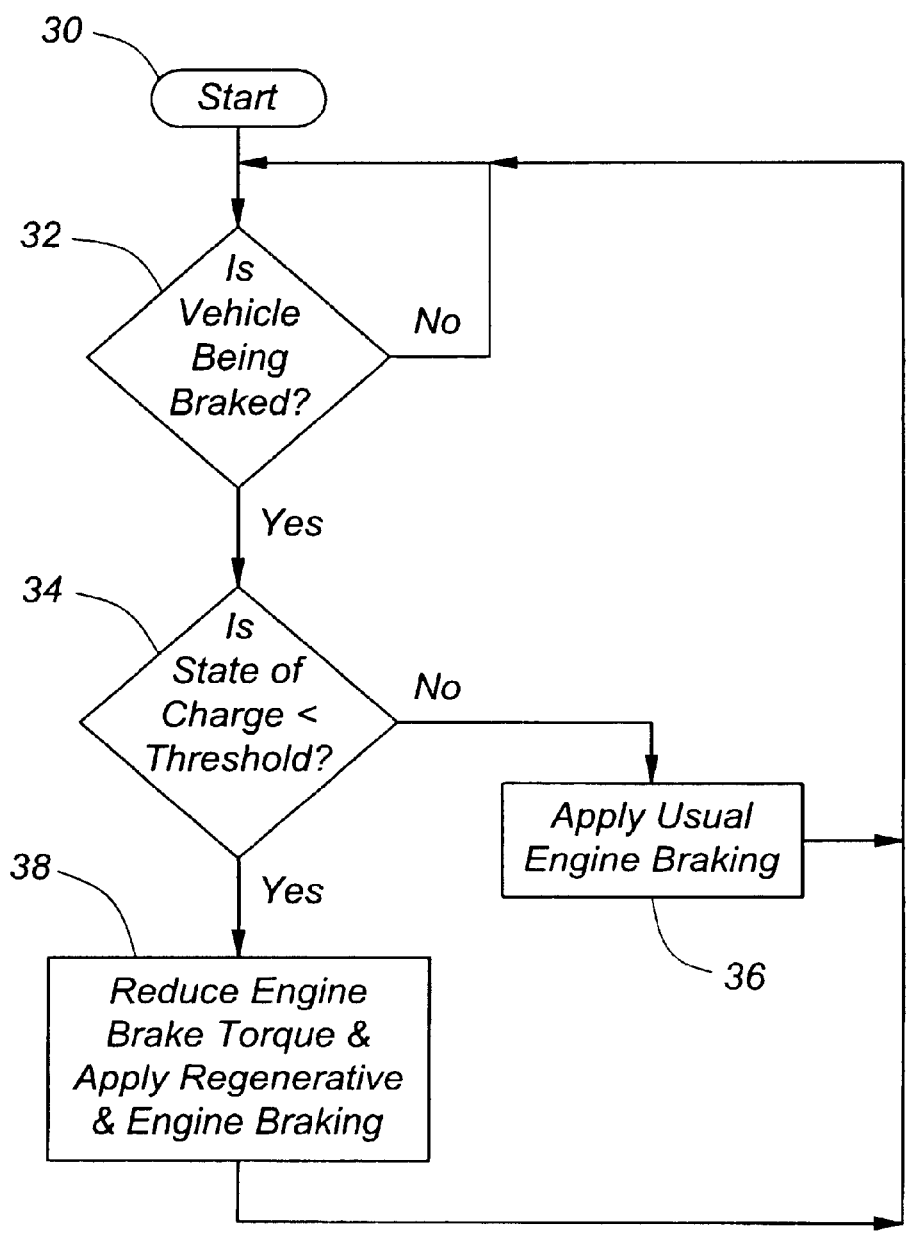

METHOD AND APPARATUS FOR BRAKING A HYBRID ELECTRIC VEHICLE

This application is a continuation-in-part of U.S. patent application Ser. No. 10/063,153 filed Mar. 26, 2002, now abandoned.

BACKGROUND OF INVENTION

1. Field of the Invention

The present invention deals with a system and method for providing both engine and regenerative braking in a hybrid electric vehicle.

2. Disclosure Information

Hybrid electric vehicles have been under development by various automotive companies for several years. Such vehicles typically utilize both an internal combustion engine and a rotating electrical machine such as a traction motor/generator for propulsive power. The rotating electrical machine is typically coupled to a storage battery which is recharged during the course of regenerative braking.

If the rotating machine incorporated in a hybrid motor vehicle, as well as the associated conductors and energy storage device (battery) have sufficient capacity, it is possible by means of regenerative braking to convert a good deal of the kinetic energy of the moving vehicle into stored charge within the vehicle's traction battery. If however, as is frequently the case, either the rotating electrical machine and associated battery and conductors are not capable of handling the high current flux which would be involved in conversion of kinetic energy, or other system capacity issues exist, it is necessary and desirable to use the combination of both regenerative braking and engine braking to achieve desired dynamic braking of the vehicle.

In order to promote the acceptability of hybrid electric vehicles to the motoring public, it is desirable to implement a braking system wherein the vehicle's driver is not aware that regenerative braking is occurring. Thus, the driver will not perceive a variable dynamic braking characteristic which would otherwise occur if maximum engine braking were augmented by regenerative braking. In other words, it is desirable that the dynamic braking of the vehicle that is, the braking due solely to engine brake torque and regenerative braking, if any, closely approximate the braking "feel" which is present when the engine alone is used for dynamic braking.

A system and method according to the present invention achieves the desired dynamic braking experience by reducing the brake torque produced by the engine in the event that regenerative braking is employed. U.S. Pat. No. 6,026,921 discloses a braking system for a hybrid vehicle having an internal combustion engine and a motor/generator. The '921 patent does not however, teach or suggest a system in which an engine brake torque is decreased at the same time regenerative brake torque is increased.

As used herein, the term "brake torque" refers to the dynamic braking capability provided by either an engine, or by a regenerative braking system. Stated another way, as the term "brake torque of the engine", means herein that the engine is capable of slowing the vehicle by providing a negative torque output having a variable magnitude determined by various engine operating parameters.

SUMMARY OF INVENTION

A method for braking a hybrid electric vehicle having an internal combustion engine and a traction motor coupled to a common output shaft, with the vehicle further having an electric energy storage device connected to the traction motor, includes the steps of monitoring operation of the vehicle to determine if the vehicle's driver is operating the vehicle in a braking mode, and in the event that the vehicle is being braked, controlling the engine and the traction motor so as to provide dynamic braking such that when the traction motor is operated regeneratively, the brake torque produced by the engine is reduced from a maximum contemporaneous brake torque value. The sum of the brake torque produced by the engine and the brake torque produced by the traction motor when the vehicle is braking is equivalent to the maximum contemporaneous brake torque from the engine. As a result the vehicle's driver will not perceive a brake torque spike caused by brake torque in excess of that torque which would normally be produced by the engine alone.

According to another aspect of the present invention, the present method may include the steps of monitoring the state of charge of the electric energy storage device and controlling the engine and traction motor so as to provide dynamic braking solely from the engine in the event that the state of charge is greater than a predetermined charge threshold.

If a hybrid electric vehicle according to the present invention is equipped with a torque converter, the torque converter will be locked by a controller when dynamic braking is occurs.

According to another aspect of the present invention, a braking system includes a controller for receiving a state of charge signal, a braking signal, and signals from other onboard monitors. In the event that the vehicle is being braked, the engine and traction motor will be controlled so as to provide dynamic braking such that when the state of charge of the electric energy storage device is less than a predetermined charge threshold, the traction motor is operated regeneratively and the brake torque produced by the engine is reduced from a maximum contemporaneous brake torque to a lesser brake torque value.

The brake torque produced by the engine may be controlled through a plurality of methods known to those skilled in the art and suggested by this disclosure. Such methods include the opening of the engine throttle to by means of an electronic throttle control or the disabling of the intake and exhaust valves of the engine's cylinders, or by adjusting of a cylinder valve camshaft drive mechanism. In any event, these three methods all reduce the torque output of the engine or more precisely, the ability of the engine to absorb power, so as to avoid the problem of the vehicle operator perceiving the dynamic braking as changing in character.

As noted above, it is an advantage of the system and method of the present invention that dynamic braking will be seamlessly perceived by the driver as unchanging, regardless of whether the traction motor battery is charged or uncharged because in the event regenerative braking is used, the engine braking capability will be diminished or decreased such that the overall dynamic braking will remain the same.

Yet another advantage of the present invention resides in the fact that a system and method according to this invention is well suited for the provision of regenerative braking with a hybrid electric vehicle in which the rotating electrical machine and the engine are mounted to a common output shaft, such as an engine crankshaft, and with the rotating electrical machine and the engine being locked together and rotating at precisely the same speed at all times.

Other advantages, as well as objects and features of the present invention, will be become apparent to the reader of this specification.

BRIEF DESCRIPTION OF DRAWINGS

FIG. 3 is a flow chart illustrating operation of a hybrid electric vehicle braking system according to the present invention.

DETAILED DESCRIPTION

Figure 1:
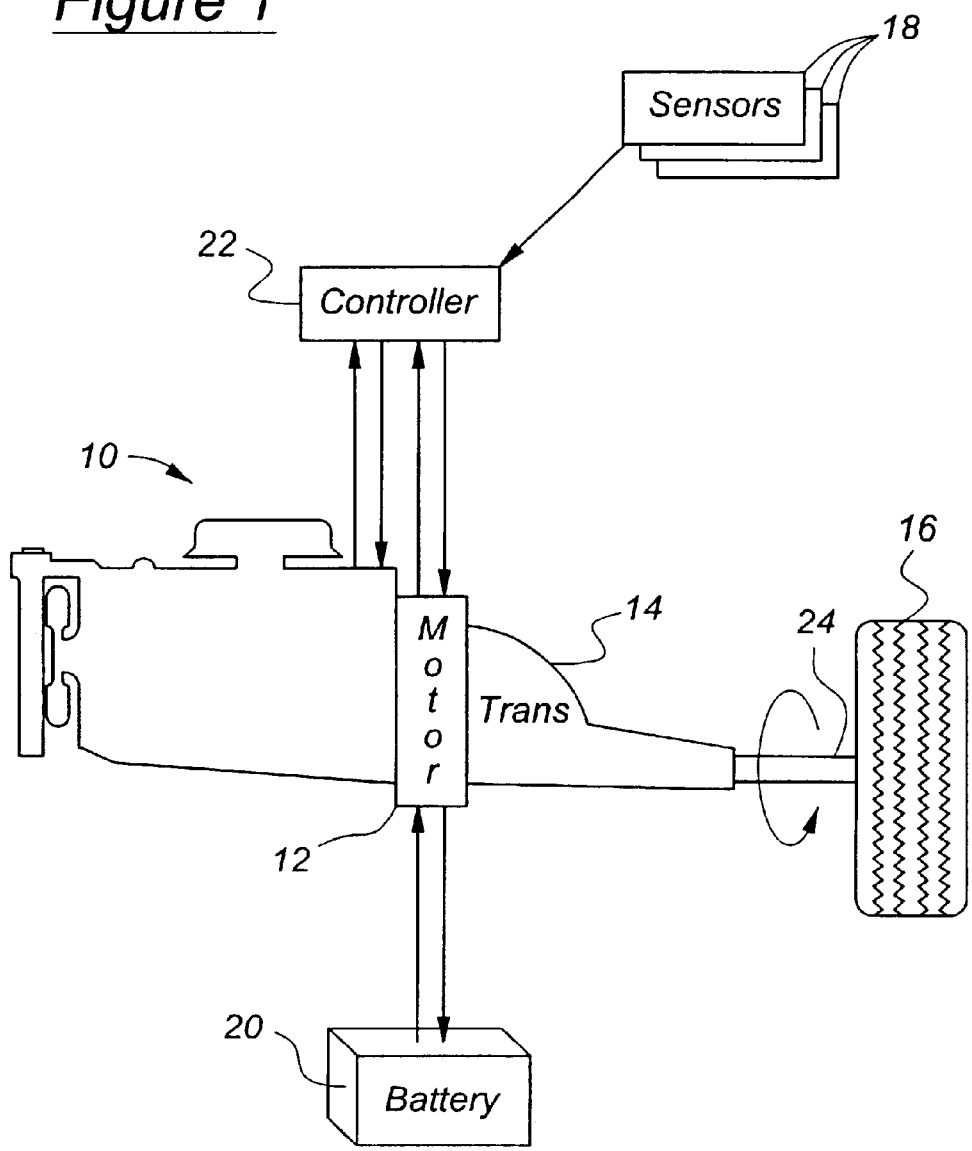
FIG. 1 is a schematic representation of a vehicle powertrain having a control system according to the present invention.

As shown in FIG. 1, a vehicle powertrain for a hybrid electric vehicle includes engine 10 with traction motor 12 interposed between engine 10 and transmission 14. In the configuration shown in FIG. 1, the traction motor may of course function as a generator for the purposes of regenerative braking. Such motor/generator arrangements are known to those skilled in the art, and are typically found in "soft hybrid" vehicles. Another feature of a system according to the present invention is that the motor/generator 12 and engine 10 are coupled to a common output shaft, in this case the engine crankshaft (not shown). The engine and motor are also coupled to transmission 14, which provides power via driveshaft 24 to at least one roadwheel 16. The present powertrain also has an electric energy storage device, in this case, battery 20. Battery 20 maybe of conventional lead-acid construction or sodium-sulfur construction or nickel-metal hydride, or other types of construction known to those skilled in the art and suggested by this disclosure.

Controller 22 operates engine 10 and motor/generator 12 according to the present invention. A plurality of sensors 18 is provided for the monitoring functions needed by controller 22 to perform its control of the braking function according to the present invention. Sensors 18 are known to those skilled in the art and suggested by this disclosure and measure such variables as accelerator position, battery state of charge, vehicle speed, and a plurality of engine operating parameters.

Figure 2:
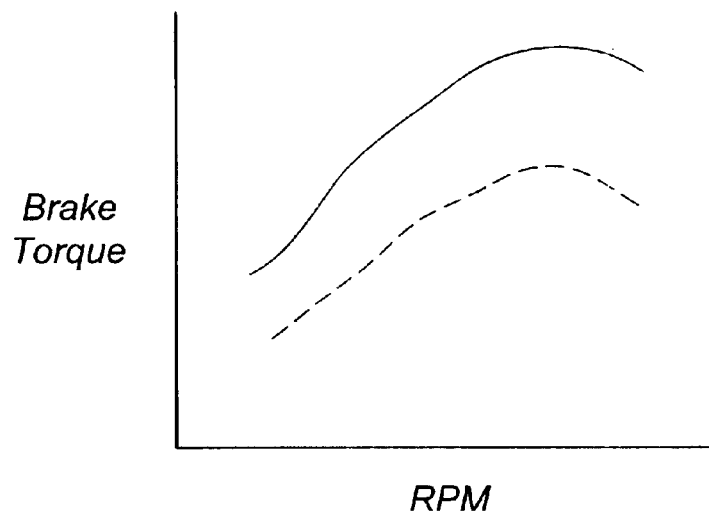
FIG. 2 is a brake torque plot of an internal combustion engine according to the present invention.

FIG. 2 illustrates a plot of rpm and brake torque for engine 10. The dotted plot shows the reduced brake torque available at a range of rpm values, as opposed to the solid line, which shows a maximum contemporaneous brake torque value. As described above, a variety of methods known to those skilled in the art may be used for the purpose of reducing the engine brake torque. In general, these methods cause the engine's pumping work to be decreased. Regardless of the method used, the first step to decreasing brake torque produced by the engine. Is to shut off the fuel. Then, opening the throttle with an electronic throttle valve control, or disabling the cylinders so as to trap air and/or exhaust gas in the cylinders will both serve reduce pumping work from the engine. Finally, a camshaft timing controller is another well known mechanism for reducing pumping work by the engine. Regardless of the method chosen, reducing pumping work will reduce the ability of the engine to generate brake torque. Controller 22 will include the data of FIG. 2 reduced to a tabular form. When regenerative braking is indicated, controller 22 will look up the reduced torque capacity of engine 10 and control the regenerative braking so that the total brake torque produced by engine 10 and motor 12 approximates the brake torque of engine 10 alone in the absence of any torque reduction.

Reduced the pumping losses has the effect of impairing the engine as an absorber of power or consumer of energy, and this allows regenerative braking to be increased to a maximum practicable value, considering various system parameters which tend to limit the regenerative capability, such as the sizes of conductors and switchgear and the ability of battery 20 to accommodate high current flux.

FIG. 3 illustrates the steps of a method for braking according to the present invention. Thus having begun at block 30, a question is posed at block 32 as to whether the vehicle is being braked. For the purposes of this specification, braking includes not only depression of the brake pedal by the driver; braking is deemed to occur whenever the vehicle speed control is disengaged by the driver or when the driver moves from throttle-on to the throttle-off position. The fact is that each of these situations normally indicates the desire of the driver to decelerate the vehicle, and as a result, dynamic braking should be put into play.

If braking is occurring at block 32, the answer is "yes" at block 32, and controller 22 moves to block 34 wherein the state of charge of battery 20 is inquired into by comparing the contemporaneous state of charge with a predetermined state of charge threshold. If the state of charge is such that the answer is "no" at block 34, the battery is deemed to be sufficiently charged so that regenerative braking should not occur, and therefore at block 36 usual engine braking is applied and the routine continues with block 32. If, on the other hand, at block 34 the answer to the question posed is "yes", this means that the battery's state of charge is less than the threshold, and at block 38 the engine brake torque will be reduced, first by shutting off the fuel in most cases, and then by any of the three techniques described above such as disabling the cylinder valves, altering the camshaft's timing, or opening the throttle via an electronic throttle control. Then, simultaneous application of regenerative and engine braking will occur, taking into account the reduced torque absorption capacity of engine 10. In this manner, the vehicle's driver will not experience altered brake feel due to the simultaneous application of both types of dynamic braking.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A method for braking a hybrid electric vehicle having an internal combustion engine and a traction motor coupled to a common output shaft, with the vehicle further having an electric energy storage device connected to the traction motor, with said braking method comprising the steps of:

monitoring operation of the vehicle to determine if the vehicle's driver is operating the vehicle in a braking mode; and in the event that the vehicle is being braked, controlling the engine and the traction motor so as to provide dynamic braking such that when the traction motor is operated regeneratively, the brake torque produced by the engine is reduced from a maximum contemporaneous brake torque value.

2. A method according to claim 1, wherein the sum of the brake torque produced by the engine and the brake torque produced by the traction motor when the vehicle is braking is equivalent to said maximum contemporaneous brake torque from the engine.

3. A method according to claim 1, further comprising the steps of:

monitoring the state of charge of said electric energy storage device; and controlling the engine and the traction motor so as to provide dynamic braking solely from the engine in the event that the state of charge is greater than a predetermined charge threshold.

4. A method according to claim 1, further comprising the step of locking a torque converter interposed between said common output shaft and a transmission in the event that said vehicle is being operated in a braking mode.

5. A method according to claim 1, wherein dynamic braking is provided when the vehicle's driver depresses a brake pedal.

6. A method according to claim 1, wherein dynamic braking is provided when the vehicle's driver disengages a vehicle speed control.

7. A method according to claim 1, wherein dynamic braking is provided when the vehicle's driver moves from a throttle-on to a throttle-off position.

8. A method according to claim 1, wherein the brake torque produced by the engine is reduced by opening the engine's throttle by means of an electronic throttle control.

9. A method according to claim 1, wherein the brake torque produced by the engine is reduced by selectively disabling intake and exhaust valves in the engine's cylinders.

10. A method according to claim 1, wherein the brake torque produced by the engine is reduced by adjusting the timing of a cylinder valve camshaft drive.

11. A system for braking a hybrid electric vehicle having an internal combustion engine and a traction motor coupled to a common output shaft, with the vehicle further having an electric energy storage device connected to the traction motor, with said system comprising:

a monitor for determining the state of charge of the electric energy storage device and for generating a state of charge signal;

a monitor for determining if the vehicle's driver is operating the vehicle in a braking mode and for generating a braking signal; and a controller for receiving the state of charge signal and the braking signal, and in the event that the vehicle is being braked, controlling the engine and the traction motor so as to provide dynamic braking such that when the state of charge of the electric energy storage device is less than a predetermined charge threshold, the traction motor is operated regeneratively and the brake torque produced by the engine is reduced from a maximum contemporaneous brake torque value to a lesser brake torque value.

12. A system according to claim 11, wherein the sum of the brake torque produced by the engine and the brake torque produced by the traction motor when the vehicle is braking is equivalent to said maximum contemporaneous brake torque from the engine.

13. A system according to claim 11, further comprising a locking a torque converter interposed between said common output shaft and a transmission, with said controller locking the torque converter in the event that said vehicle is being operated in a braking mode.

14. A method for braking a hybrid electric vehicle having an internal combustion engine and a traction motor coupled to a common output shaft, and with the vehicle further having an electric energy storage device connected to the traction motor, with said braking method comprising the steps of:

monitoring the state of charge of said electric energy storage device;

monitoring operation of the vehicle to determine if the vehicle's driver is operating the vehicle in a braking mode; and in the event that the vehicle is being braked at a time when the state of charge is less than a predetermined threshold, controlling the engine and the traction motor so as to provide dynamic braking such that when the traction motor is operated regeneratively the brake torque produced by the engine is reduced from a maximum contemporaneous brake torque value, with the sum of the brake torque produced by the engine and the brake torque produced by the traction motor being equivalent to said maximum contemporaneous brake torque from the engine.

15. A method according to claim 14, further comprising the step of locking a torque converter interposed between said common output shaft and a transmission when said vehicle is being operated in a braking mode.

16. A method according to claim 14, wherein dynamic braking is provided when the vehicle's driver depresses a brake pedal and when the driver moves from throttle-on to a throttle-off position.

* * * * *